(12) United States Patent
Shimazu et al.

(10) Patent No.: US 8,610,551 B2
(45) Date of Patent: Dec. 17, 2013

(54) VEHICLE STATUS NOTIFICATION DEVICE AND A VEHICLE STATUS NOTIFICATION METHOD FOR A CONSTRUCTION MACHINE

(75) Inventors: Mitsuhiro Shimazu, Fujisawa (JP); Koichi Yamashita, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/583,680

(22) PCT Filed: Nov. 1, 2011

(86) PCT No.: PCT/JP2011/075144
§ 371 (c)(1),
(2), (4) Date: Sep. 10, 2012

(87) PCT Pub. No.: WO2012/060355
PCT Pub. Date: May 10, 2012

(65) Prior Publication Data
US 2013/0207797 A1    Aug. 15, 2013

(30) Foreign Application Priority Data

Nov. 5, 2010    (JP) .................................. 2010-248476

(51) Int. Cl.
*B60Q 1/00* (2006.01)
*G06F 7/70* (2006.01)

(52) U.S. Cl.
USPC ........ 340/441; 340/438; 340/439; 340/425.5; 701/50

(58) Field of Classification Search
USPC .............. 340/441, 438, 439, 450, 450.3, 461, 340/679, 680, 685, 425.5; 701/29, 50, 1, 701/54; 37/202, 308, 361, 397; 307/10.1, 307/10.3, 10.6
See application file for complete search history.

(56) References Cited

U.S. PATENT DOCUMENTS

| | | | |
|---|---|---|---|
| 6,642,841 B2 * | 11/2003 | Ito ................................. | 340/441 |
| 6,768,221 B2 * | 7/2004 | Klinger et al. ................ | 307/10.7 |
| 6,924,737 B2 * | 8/2005 | Miller ........................... | 340/441 |
| 6,998,956 B2 * | 2/2006 | Dix ................................ | 340/5.2 |

FOREIGN PATENT DOCUMENTS

| | | |
|---|---|---|
| JP | 10-047094 A | 2/1998 |
| JP | 2002-173299 A | 6/2002 |
| JP | 2008-248627 A | 10/2008 |
| JP | 2010-096017 A | 4/2010 |

OTHER PUBLICATIONS

International Search Report dated Jan. 31, 2012, issued for PCT/JP2011/075144.

* cited by examiner

*Primary Examiner* — Anh V La
(74) *Attorney, Agent, or Firm* — Edwards Wildman Palmer LLP

(57) ABSTRACT

A vehicle status notification device for a construction machine, includes: a key switch connected to a battery; an engine shut-off switch which is serially connected to a downstream side of the key switch in a connection line between the battery and an engine controller configured to control engine operation; and a control unit configured to perform control to notify a notification unit that the engine shut-off switch is in an OFF state in a case that a signal at the downstream side of the engine shut-off switch is in the OFF state while a signal at an upstream side of the engine shut-off switch is in an ON state.

13 Claims, 6 Drawing Sheets

VEHICLE STATUS NOTIFICATION DEVICE AND A VEHICLE STATUS NOTIFICATION METHOD FOR A CONSTRUCTION MACHINE

FIELD

The present invention relates to a vehicle status notification device and a vehicle status notification method for a construction machine with which an operator can rapidly recognize that an engine shut-off switch is in an OFF (disconnected) state.

BACKGROUND

A construction machine such as a hydraulic shovel is provided with an engine shut-off switch capable of shutting off an engine or the like without turning off a key switch arranged at a driver's seat as a device to rapidly shut off operation of the construction machine.

For example, in Patent Literature 1, it is disclosed that a neutral limit switch corresponding to a hydraulic lock lever and a second shut-down switch corresponding to an engine shut-off switch are serially arranged on a key switch control circuit and the key switch control circuit is shut off in accordance with operational positions of the hydraulic lock lever and the engine shut-off switch.

CITATION LIST

Patent Literature

Patent Literature 1: Japanese Patent Application Laid-open No. 2010-096017

SUMMARY

Technical Problem

By the way, not being a switch to be routinely used like a key switch, an engine shut-off switch of a construction machine is arranged at a position below a driver's seat in some cases. In such cases, operational status of the engine shut-off switch cannot be viewed when an operator sits on the driver's seat. Further, since the engine shut-off switch is not a switch to be routinely used, there is also a case that an operator forgets existence and function of the engine shut-off switch.

Accordingly, in a case that an engine or the like becomes shut off owing to that the engine shut-off switch is in an OFF (disconnected) state when an operator returns after leaving with the engine or the like running, the operator cannot acknowledge rapidly why the engine or the like is in a shut-off state because a monitor indicating vehicle status is not in operation as well. Then, the operator performs vehicle inspection with various operations as considering failure or abnormality occurs at the vehicle, so that wasted time and labor are to be spent.

To address the above, an object of the present invention is to provide a vehicle status notification device and a vehicle status notification method for a construction machine with which an operator can rapidly recognize that an engine shut-off switch is in an OFF (disconnected) state.

Solution to Problem

To overcome the problems and achieve the object, according to the present invention, a vehicle status notification device for a construction machine, comprises: a key switch connected to a battery; an engine shut-off switch which is serially connected to a downstream side of the key switch in a connection line between the battery and an engine controller configured to control engine operation; and a control unit configured to perform control to notify a notification unit that the engine shut-off switch is in an OFF state in a case that a signal at the downstream side of the engine shut-off switch is in the OFF state while a signal at an upstream side of the engine shut-off switch is in an ON state.

According to the present invention, the control unit is arranged in a monitor controller.

According to the present invention, the control unit is composed of a discrete component.

According to the present invention, the control unit is an inverting circuit configured to use the single at the upstream side of the engine shut-off switch as a power source when the signal at the upstream side of the engine shut-off switch is in the ON state and to use the signal at the downstream side of the engine shut-off switch as an input signal.

According to the present invention, the control unit is configured to perform, in a case that the signal at the downstream side of the engine shut-off switch is in the OFF state, processing control to invalidate a process for abnormality detection which is to be performed when the signal at the downstream side of the engine shut-off switch is in the ON state.

According to the present invention, the engine shut-off switch is configured to be surrounded by a switch state protecting unit configured to protect an ON/OFF state of the engine shut-off switch.

According to the present invention, the switch state protecting unit is a cover configured to cover the engine shut-off switch.

According to the present invention, the engine shut-off switch is arranged at a lower part of a driver's seat.

According to the present invention, the vehicle status notification device for a construction machine further comprises a monitor configured to display and output at least a control content of the control unit, and the notification unit is the monitor and causes a display screen of the monitor to display and output that the engine shut-off switch is in the OFF state.

According to the present invention, the monitor controller includes a holding circuit configured to cause power to be supplied directly from the battery into the monitor controller in a case that the signal at the upstream side of the engine shut-off switch is in the ON state and to cause power to be supplied directly from the battery into the monitor controller during the monitor controller is in operation even when the signal at the upstream side of the engine shut-off switch is switched into the OFF state.

According to the present invention, a vehicle status notification device for a construction machine, comprises: a monitor controller configured to perform monitoring of operational status of the construction machine; one or more other controllers configured to output various data to the monitor controller, the controllers including an engine controller configured to control engine operation; a key switch connected to a battery; an engine shut-off switch which is serially connected to a downstream side of the key switch in a connection line between the battery and the engine controller; and a control unit configured to perform control to switch a display screen of a monitor to output that the engine shut-off switch is in an OFF state to the display screen in a case that a signal at the downstream side of the engine shut-off switch is in the OFF state while a signal at an upstream side of the engine shut-off switch is in an ON state, and to perform, in a case that the signal at the downstream side of the engine shut-off switch is in the OFF state, processing control to invalidate a process for abnormality detection which is to be performed when the signal at the downstream side of the engine shut-off switch is in the ON state.

According to the present invention, a vehicle status notification method for a construction machine including a key switch connected to a battery and an engine shut-off switch which is serially connected to a downstream side of the key switch in a connection line between the battery and an engine controller to control engine operation, the method comprises: performing control to notify a notification unit that the engine shut-off switch is in an OFF state in a case that a signal at the downstream side of the engine shut-off switch is in the OFF state while a signal at an upstream side of the engine shut-off switch is in an ON state.

According to the present invention, the vehicle status notification method for a construction machine further comprises performing, in a case that the signal at the downstream side of the engine shut-off switch is in the OFF state, processing control to invalidate a process for abnormality detection which is to be performed when the signal at the downstream side of the engine shut-off switch is in the ON state.

Advantageous Effects of Invention

The present invention includes a key switch connected to a battery and an engine shut-off switch which is serially connected to a downstream side of the key switch in a connection line between the battery and an engine controller configured to control engine operation and perform control to notify a notification unit that the engine shut-off switch is in an OFF state in a case that a signal at the downstream side of the engine shut-off switch is in the OFF state while a signal at an upstream side of the engine shut-off switch is in an ON state. Accordingly, an operator can rapidly recognize that the engine shut-off switch is in the OFF (disconnected) state and time and labor required for wasted inspection and the like can be reduced.

DESCRIPTION OF EMBODIMENTS

In the following, embodiments to actualize the present invention will be described with reference to the attached drawings.

First Embodiment

Figure 1:
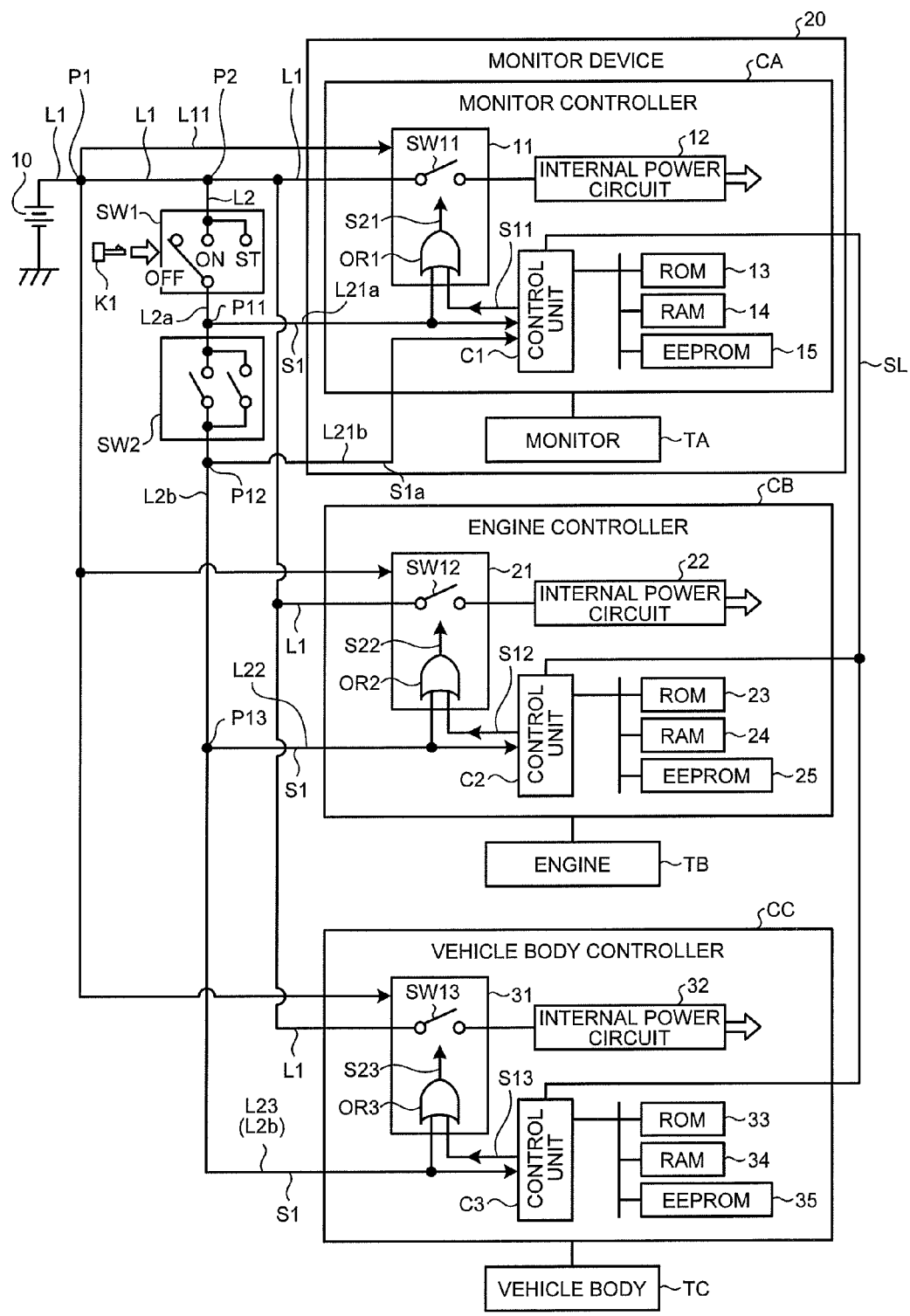
FIG. 1 is a block diagram illustrating a general circuit configuration of a vehicle status notification device for a construction machine according to a first embodiment of the present invention.

FIG. 1 is a block diagram illustrating a general circuit configuration of a vehicle status notification device for a construction machine according to a first embodiment of the present invention. The vehicle status notification device for a construction machine is mounted on a construction machine such as a hydraulic shovel and a wheel loader. In FIG. 1, power is supplied from a battery 10 to a monitor controller CA, an engine controller CB and a vehicle body controller CC. Further, the respective controllers being the monitor controller CA, the engine controller CB and the vehicle body controller CC are activated and deactivated by an ON/OFF signal of a single key switch SW1. Here, the key switch SW1 is turned on and off by a key K1. Further, an engine shut-off switch SW2 is actualized by a parallel two-contact type toggle switch and is serially connected to a downstream side of the key switch SW1. When being in an OFF (disconnected) state, the engine shut-off switch SW2 deactivates the engine controller CB and the vehicle body controller CC as stopping power supply to the engine controller CB and the vehicle body controller CC.

Here, the key switch SW1 is a switch to switch among engine starting (restarting), an engine operation state and shut-off by being with the key K1 inserted thereto. The key switch SW1 illustrated in FIG. 1 is a three-contact type switch. When the key switch SW1 is at a position of "ST", an engine is started (restarted) with operation of a starter motor (not illustrated). When the key switch SW1 is at a position of "ON", the engine is in the engine operation state after the engine starting (restarting). Further, when the key switch SW1 is at a position of "OFF", the engine is in a shut-off state.

Here, the monitor controller CA causes a monitor TA to display an engine water temperature value and a fuel remaining amount, for example, based on signals from sensors at various parts of a construction machine which are connected directly thereto or signals inputted from other controllers via a later-mentioned signal line SL. When a signal of abnormal information is inputted from another controller, a caution mark or the like is displayed. The monitor TA is actualized with a display such as liquid crystal and may be further provided with an input-output function as a touch panel. Further, the engine controller CB is a controller which controls a fuel injection amount to a combustion chamber of an engine TB based on a detection result of a group of various sensors. Further, the vehicle body controller CC is a controller which controls, for example, an inclination angle of a swash plate of a hydraulic pump to be driven by a drive unit in a vehicle body TC, for example, by the engine TB. The hydraulic pump is a supply source of oil to be supplied to a hydraulic cylinder which operates working machines such as a boom, an arm and a bucket (not illustrated). In FIG. 1, the monitor controller CA and the monitor TA are actualized as being integrated as a monitor device 20. However, the monitor controller CA and the monitor TA may be actualized as a separated structure.

The plus side of the battery 10, that is, an plus end of a battery which is connected at the utmost plus side among a plurality of batteries, is connected to a power line L1, and is connected to one end of each of internal power switches SW11, SW12, SW13 of the monitor controller CA, the engine controller CB and the vehicle body controller CC. Further, the plus side of the battery 10 is connected to each of holding circuits 11, 21, 31 of the monitor controller CA, the engine controller CB and the vehicle body controller CC via a branch line L11 branched from a branch point P1 on the power line L1. That is, the holding circuits 11, 21, 31 directly receive power respectively from the battery 10.

Further, the key switch SW1 is arranged to have one end thereof connected to a branch point P2 on the power line L1 via a branch line L2. The engine shut-off switch SW2 is serially connected to the other end of the key switch SW1 via a branch line L2a. A branch point P11 on the branch line L2a is connected to a control unit C1 of the monitor controller CA via a branch line L21a. A branch line L2b is connected to the downstream side of the engine shut-off switch SW2. A branch point P12 on the branch line L2b is connected to the control unit C1 of the monitor controller CA via a branch line L21b. Further, a branch point P13 on the branch line L2b is connected to a control unit C2 of the engine controller CB via a branch line L22. Further, the branch line L2b directly as a branch line L23 is connected to a control unit C3 of the vehicle body controller CC. That is, one side of the key switch SW1 is connected to the power line L1 and the other side thereof is connected to the control unit C1 of the monitor controller CA and the engine shut-off switch SW2. Further, the downstream side of the engine shut-off switch SW2 is connected to the respective control units C1, C2, C3 of the monitor controller CA, the engine controller CB and the vehicle body controller CC.

Each of the monitor controller CA, the engine controller CB and the vehicle body controller CC includes the holding circuit 11, 21, 31, an internal power circuit 12, 22, 32 such as a DC/DC converter, the abovementioned control unit C1, C2 C3 which performs control of each controller, and a ROM 13, 23, 33, a RAM 14, 24, 34 and an EEPROM 15, 25, 35 which are connected to the control unit C1, C2, C3.

Each holding circuit 11, 21, 31 includes the internal power switch SW11, SW12, SW13 and an OR circuit OR1, OR2, OR3. Each internal power switch SW11, SW12, SW13 is arranged between the plus side of the battery 10 via the power line L1 and the internal power circuit 12, 22, 32 and is actualized with a transistor, an FET or the like. When each of the internal power switches SW11, SW12, SW13 is turned on, power is supplied from the battery 10 to each of the internal power circuits 12, 22, 32. Each of the internal power circuits 12, 22, 32 converts voltage of 24 V into desired voltage and supplies power to various parts respectively in the monitor controller CA, the engine controller CB and the vehicle body controller CC. Here, the holding circuits 11, 21, 31 are actualized with discrete components such as transistors.

In a case that the engine shut-off switch SW2 is in an ON (connected) state, an ON/OFF signal S1 of the key switch SW1 is input to each control unit C1, C2, C3 as well as each OR circuit OR1, OR2, OR3. When the key switch SW1 is turned on and the ON/OFF signal S1 being ON is input to the OR circuits OR1, OR2, OR3, the internal power switches SW11, SW12, SW13 are switched from OFF to ON and the battery 10 is connected to the internal power circuits 12, 22, 32. Thus, power is supplied to the control units C1, C2, C3 of the respective controllers. Then, owing to activation of the respective control units C1, C2, C3, programs and data stored in the ROM 13, 23, 33 and the EEPROM 15, 25, 35 are read and control of the respective controllers is started.

In a case that the ON/OFF signal S1 is switched from ON to OFF, each control unit C1, C2, C3 performs a process to transfer various data currently stored in each RAM 14, 24, 34 to each EEPROM 15, 25, 35. Then, each controller is in operation at least during the transfer process. Accordingly, as long as each controller is in operation, each control unit C1, C2, C3 inputs an operating signal S11, S12, S13 outputting an ON signal to each OR circuit OR1, OR2, OR3. With the above, power supply is ensured for the abovementioned transfer process at the time of operational completion of each controller. Here, the various data relate to vehicle body information such as a service meter value, a driving ratio against vehicle body operational time indicated by the service meter, a loading frequency of a hydraulic pump, and a number of failure times and failure history at each controller, for example.

That is, each ON/OFF signal S21, S22, S23 obtained by logical addition calculation causing ON when either the ON/OFF signal S1 from the key switch SW1 or each operating signal S11, S12, S13 from each control unit C1, C2, C3 is ON is output by each OR circuit OR1, OR2, OR3 to each internal power switch SW11, SW12, SW13. Consequently, the internal power switch SW11, SW12, SW13 are not turned off during a predetermined period being necessary for the transfer process of the various data even when the key switch SW1 is turned off as being turned off after the transfer process.

In contrast, when the engine shut-off switch SW2 becomes in the OFF (disconnected) state while the key switch SW1 is in the ON state, the ON/OFF signal S1 toward the control unit C2 of the engine controller CB and the control unit C3 of the vehicle body controller CC becomes in the OFF state. Accordingly, in this case, power supply to the engine controller CB and the vehicle body controller CC is to be discontinued after holding processes of the holding circuits 21, 31. However, the ON/OFF signal S1 to the control unit C1 of the monitor controller CA is maintained in the ON state, so that power supply to the monitor controller CA is not discontinued. That is, even when the engine shut-off switch SW2 is mandatorily switched into the OFF state while the key switch SW1 is in the ON state, power supply to the monitor controller CA is not discontinued and the monitor controller CA continues to operate. Here, the monitor TA connected to the monitor controller CA receives power from the monitor controller CA. Therefore, even when the engine shut-off switch SW2 is switched into the OFF state while the key switch SW1 is in the ON state, the monitor TA continues to operate as receiving power.

As described above, the holding circuits 11, 21, 31 are actualized with discrete components such as transistors in the respective controllers as directly receiving power respectively from the battery 10. This is to cause the internal power switches SW11, SW12, SW13 to be in the ON state to supply power only when the key switch SW1 is in the ON state or the key switch SW1 and the engine shut-off switch SW2 are in the ON state (connected state) at the time of controller restarting.

Further, the controllers are mutually connected. In particular, the monitor controller CA receives the various data from the other controllers. The connection is actualized with the signal line SL preferably such as a CAN (Controller Area Network) in the vehicle.

Further, in the abovementioned embodiment, each holding circuit 11, 21, 31 is arranged in each controller. However, instead of the holding circuits 11, 21, 31, it is also possible to separately arrange a separate battery respectively to the controllers or a common battery to the respective controllers.

Further, one or more controllers connected to the downstream side of the engine shut-off switch SW2 described above include at least the engine controller CB. This is because that the engine shut-off switch SW2 is at least to shut off the engine and that a controller other than the engine controller CB among the controllers connected to the downstream side of the engine shut-off switch SW2 may be in a power-received state in a case that the engine shut-off switch SW2 is OFF (disconnected). In the first embodiment, power supply to the vehicle body controller CC connected to the downstream side of the engine shut-off switch SW2 is also discontinued in accordance with turning-off of the engine shut-off switch SW2. Thus, it is preferable that driving of a hydraulic actuator, an electric actuator or the like can be reliably shut off as well.

Figure 2:
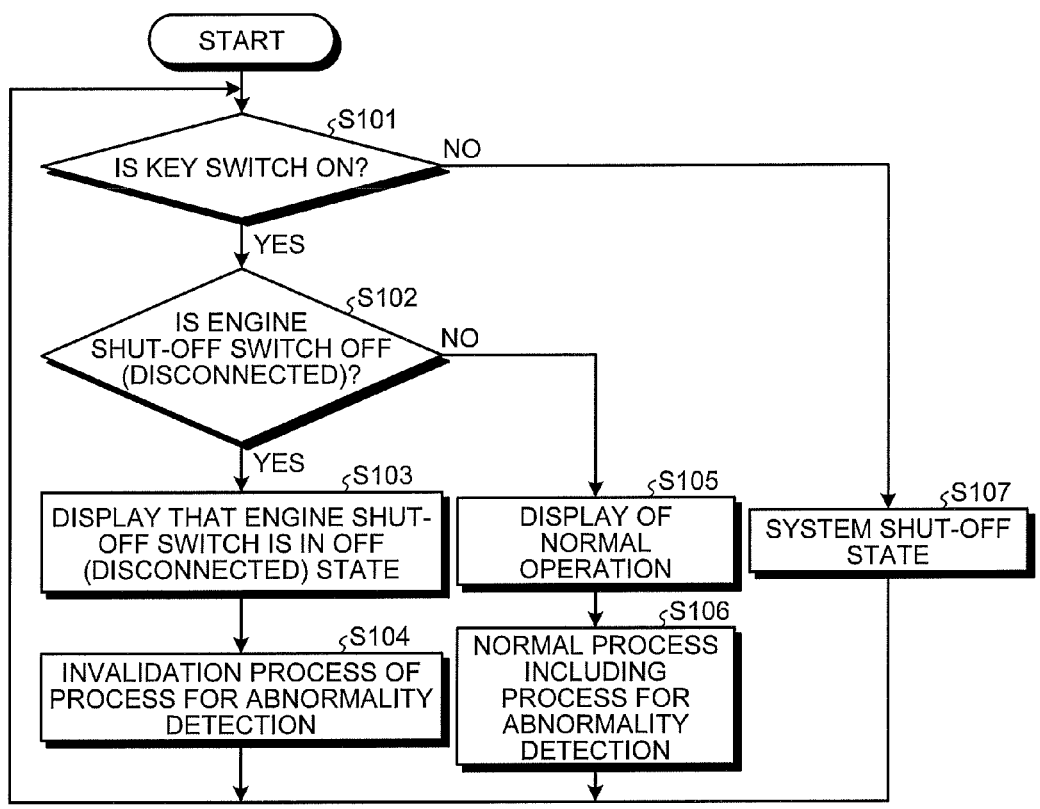
FIG. 2 is a flowchart illustrating monitor control processing procedure which includes monitor display control in the vehicle status notification device illustrated in FIG. 1.

In the following, monitor control processing procedure including monitor display control with the monitor controller CA will be described with reference to a flowchart illustrated in FIG. 2. As illustrated in FIG. 2, first, the control unit C1 of the monitor controller CA detects the ON/OFF signal S1 at the branch point P11 at the upstream side of the engine shut-off switch SW2 as being at the downstream side of the key switch SW1 and determines whether or not the key switch SW1 is ON (step S101). In a case that the key switch SW1 is ON ("Yes" in step S101), it is further determined whether or not the ON/OFF signal S1a at the branch point P12 at the downstream side of the engine shut-off switch SW2 is OFF (disconnected) (step S102). In a case that the key switch SW1 is not ON ("No" in step S101), power supply to the system is discontinued and the system becomes in a shut-off state (step S107) and it proceeds to step S101.

Figure 3:
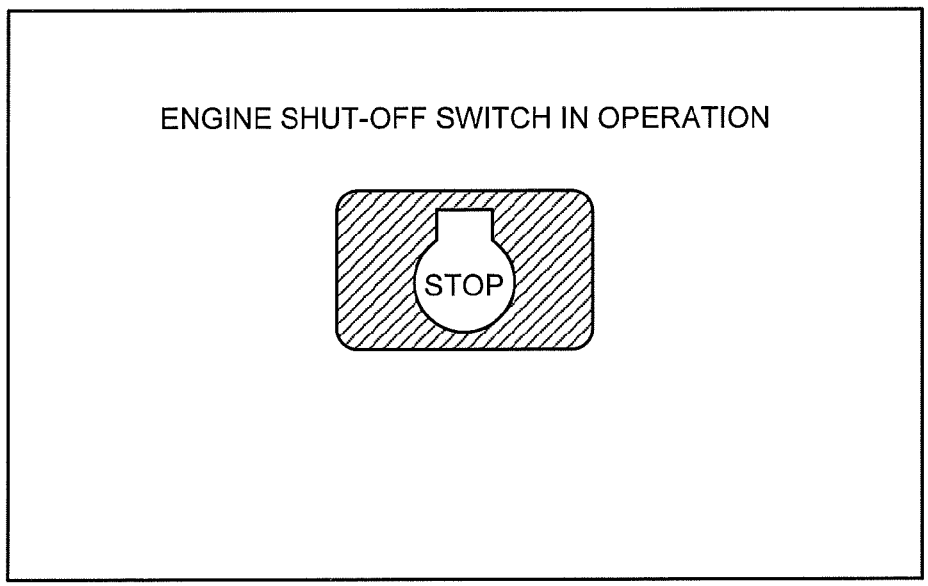
FIG. 3 is a view illustrating an example of a monitor screen when an engine shut-off switch is in an OFF (disconnected) state.

In a case that the ON/OFF signal S1a of the engine shut-off switch SW2 is OFF ("Yes" in step S102), indication that the engine shut-off switch SW2 is in the OFF (disconnected) state is displayed on a display screen of the monitor TA (step S103). That is, the display screen is to be in a different state from the display screen before the ON/OFF signal S1a of the engine shut-off switch SW2 becomes OFF (e.g., the display screen on which a monitor display screen illustrated in FIG. 4 or a camera image is indicated). For example, text display as "Engine shut-off switch in operation" and graphic display are performed as illustrated in FIG. 3. The graphic at the center is preferably in red to be easily noticed by an operator. Naturally, it is also possible to have only text display or graphic display, or further, to have audio output as well. Further, not only with display output and audio output, notification output can be performed to include physical motion of an object such vibration of a driver's seat and the like and combination thereof.

In a case that the engine shut-off switch SW2 is in the OFF state, the control unit C1 performs an invalidation process to invalidate a process for abnormality detection (step S104) and the abovementioned processes are repeated as proceeding to step S101. The process for abnormality detection is a process such as detecting abnormality which is caused by discontinuation of information output from another controller electrically connected to the monitor controller CA via the signal line SL, displaying and buzzer rumbling corresponding to the abnormality detection, recording and storing of the abnormality detection, and the like. The above is because that the abnormality detection and the like are caused by the mandatory engine shut-off switch SW2 and that the abnormality detection and the like are normal in a case that the engine shut-off switch SW2 is switched into the OFF state. In a case that process for abnormality detection such as a counting process of the number of abnormality occurrence times and a display process and a buzzer rumbling process which correspond to abnormality detection is performed, the counting process, the displaying process, the buzzer rumbling process and the like which are unnecessary, for example, are prevented from being performed by performing the invalidation process of step S104. Consequently, the number of abnormality occurrence times can be accurately obtained and unnecessary displaying and rumbling can be suppressed.

Figure 4:
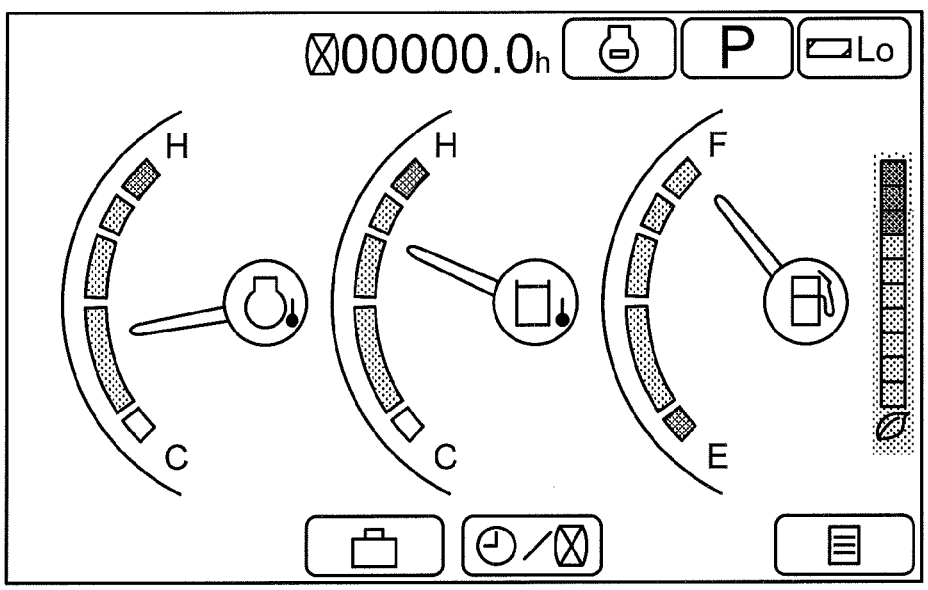
FIG. 4 is a view illustrating an example of a monitor screen when the engine shut-off switch is in an ON (connected) state.

On the other hand, in a case that the engine shut-off switch SW2 is ON (connected) ("No" in step S102), normal operation display such as displaying monitor indication of various meters is performed on the monitor TA (step S105) as illustrated in FIG. 4 and a normal process including the process for abnormality detection in abnormality occurrence is performed (step S106), and then, the above processes are repeated as proceeding to step S101.

Here, the monitor indication illustrated in FIG. 4 displays at least an engine water temperature indicating a state of engine water temperature and a fuel amount indicating a fuel remaining amount and displays an alarm when abnormality occurs at the vehicle. Further, the monitor indication illustrated in FIG. 4 displays a service meter, an operational mode state and the like.

Further, in the display process that the engine shut-off switch SW2 is in the OFF (disconnected) state in the first embodiment described above, a display switching, for example, to switch the whole screen of FIG. 4 to the whole screen of FIG. 3 is performed. However, not limited to this, it is also possible to perform partial displaying or overlapped displaying. For example, the graphic and the text at the center section of FIG. 3 may be displayed at the screen center section of FIG. 4 as being superimposed thereto. Alternatively, displaying may be performed as allocating a partial range of the screen of FIG. 4 as a range at which the graphic or the text at the center section of FIG. 3 is to be displayed.

Here, the invalidation process in step S104 is not essential and the invalidation process may not be performed. For example, the invalidation process becomes unnecessary in a case that the monitor controller CA can acquire information of all sensors in a construction machine, and the like.

Here, the engine shut-off switch SW2 is the parallel two-contact type switch. It is preferable to be a parallel multi-contact type switch. Since connection is performed at a plurality of contact points when the engine shut-off switch SW2 is in the ON (connected) state, the connection is ensured. Meanwhile, the plurality of contact points prevent the engine shut-off switch SW2 from being easily switched into the OFF (disconnected) state by impact and the like.

Figure 5:
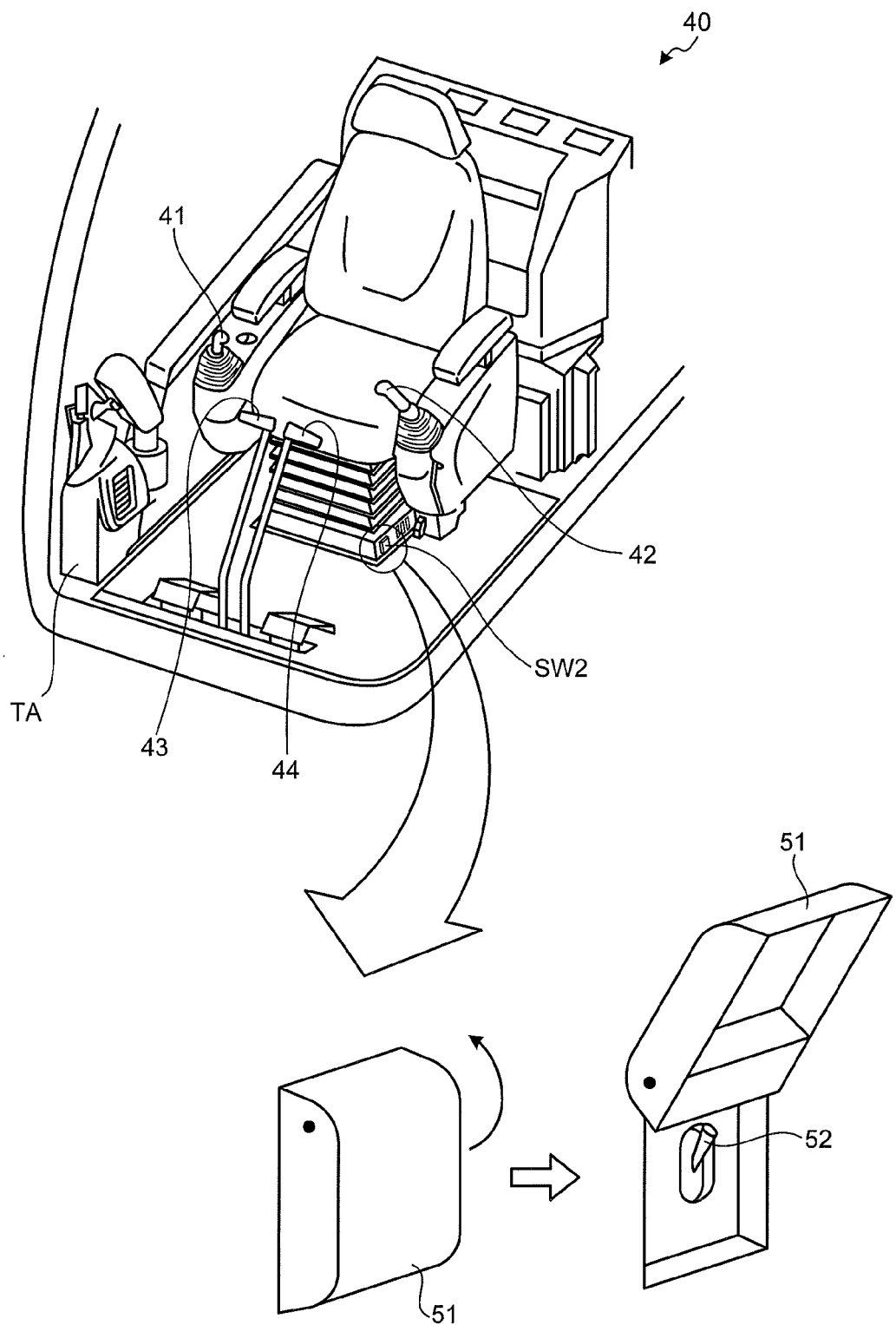
FIG. 5 is a view illustrating an example of positional arrangement of the engine shut-off switch.

FIG. 5 is a perspective view illustrating an outline of a driver's seat of a construction machine. A driver's seat 40 is arranged swingably at an upper swing body via a swinging function at an upper part of a lower driving body. As illustrated in FIG. 5, the driver's seat 40 is provided at the right side and the left side of the front thereof with a right operational lever 41 for working machine operation, a left operational lever 42 for arm and swinging operation, a right operational lever 43 for driving operation, and a left operational lever 44 for driving operation. Further, the monitor TA including the monitor controller CA is arranged at the right front. The display screen of the monitor TA is faced to the driver's seat side.

Here, the engine shut-off switch SW2 is preferably arranged in a driver's room, and more preferably, arranged at a lower part of a seat of the driver's seat as being at a side of a door (not illustrated) (the upper left side in the drawing). The positional arrangement described above is to facilitate to operate the engine shut-off switch SW2 from the ground without getting on the driver's seat, for example. Here, the lower part of the seat of the driver's seat denotes a position below a seating face on which an operator sits. Accordingly, the engine shut-off switch SW2 may be attached to a seat body or a bracket which attaches the seat to the driver's seat. Further, in a case that equipment such as a console is arranged beside the seat, the engine shut-off switch SW2 may be attached to the equipment such as the console as long as being below the seating face of the seat.

As illustrated in FIG. 5, the engine shut-off switch SW2 is covered with an openable and closable cover 51 as a switch state protecting unit being in a state that a toggle switch 52 is embedded therein. Owing to arranging the cover 51 described above, ON/OFF of the switch can be prevented from being performed with unexpected external force such as being hit with an operator's foot. Further, vehicle stealing can be suppressed by arranging the switch state protecting unit. That is, when an operator gets off from the driver's seat, the engine shut-off switch SW2 is turned off and the engine shut-off switch SW2 is covered with the cover 51. Accordingly, even if trying to start the engine by turning the key switch SW1, a thief cannot easily recognize an installation position of the engine shut-off switch SW2 and cannot start the engine.

Here, the abovementioned engine shut-off switch SW2 is arranged at a seat lower part of the driver's seat. However, not limited to this, it is also possible to be arranged beside a console such as the monitor TA or outside the driver's seat. Further, the engine shut-off switch SW2 is covered with the cover 51. However, not limited to this, it is also possible to form a concave portion at an attaching face of the engine shut-off switch SW2 as the switch state protecting unit and to arrange the engine shut-off switch SW2 at the concave portion. In this case, since a lever of a toggle switch is not protruded as being surrounded by a surface of the concave portion, ON/OFF of the switch can be prevented from being performed with unexpected external force. Further, since existence of the engine shut-off switch SW2 becomes more unlikely to be recognized as being surrounded by the switch state protecting unit, vehicle stealing can be suppressed.

In the first embodiment, the engine shut-off switch SW2 is arranged at the downstream side of the key switch SW1. Then, owing to detecting signals at the upstream side and the downstream side of the engine shut-off switch SW2, the monitor controller CA determines whether or not the engine shut-off switch SW2 is in the OFF (disconnected) state while the key switch SW1 is in the ON state. In a case that the engine shut-off switch SW2 is in the OFF state, indication that the engine shut-off switch SW2 is in the OFF (disconnected) state is displayed on the display screen of the monitor TA to enable the operator to be rapidly notified of the indication. Further, in a case that the engine shut-off switch SW2 is in the OFF state, the monitor controller CA invalidates the process for abnormality detection which is performed during normal operation to perform appropriate processes corresponding to the OFF state of the engine shut-off switch SW2.

In Patent Literature 1, it has been required for shutting off an engine to arrange a fuel supply solenoid which controls fuel supply to the engine and a relay to switch powering state of the solenoid separately from an engine control device which controls fuel injection timing and a fuel injection amount. However, in the first embodiment, it is only required to arrange the engine shut-off switch SW2 at the downstream side of the key switch SW1, to detect the signals at the upstream side and the downstream side of the engine shut-off switch SW2, to reliably detect the state of the engine shut-off switch SW2, and to perform the invalidation process corresponding thereto. Accordingly, it is not required to add a design modification to one or more controllers such as the engine controller CB and the vehicle body controller CC which are connected to the downstream side of the monitor controller CA. Therefore, the configuration of the first embodiment can be easily actualized even using an existing construction machine.

Second Embodiment

Next, a second embodiment of the present invention will be described. In the first embodiment described above, state detection of the engine shut-off switch SW2 and the corresponding process are performed by the monitor controller CA. In the second embodiment, the state detection of the engine shut-off switch SW2 and the corresponding process are performed only by adding a simple external circuit. Here, the added external circuit is structured with discrete components.

Figure 6:
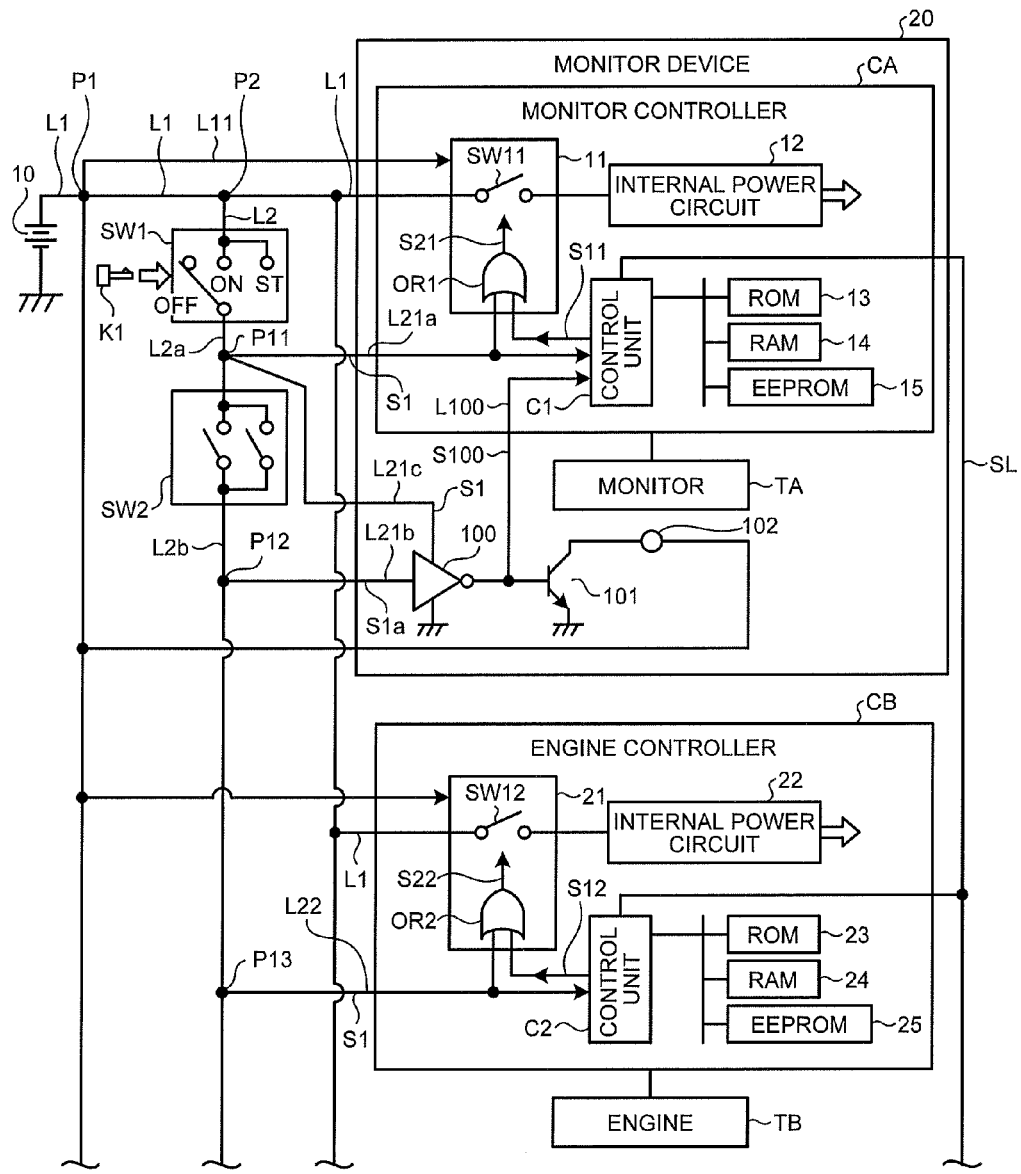
FIG. 6 is a block diagram illustrating a general circuit configuration of a vehicle status notification device for a construction machine according to a second embodiment of the present invention.

FIG. 6 is a block diagram illustrating a general circuit configuration of a vehicle status notification device for a construction machine according to the second embodiment of the present invention. As illustrated in FIG. 6, connection is performed from the branch point P11 at the upstream side of the engine shut-off switch SW2 to an inverting circuit 100 via a branch line L21c as a power source of the inverting circuit 100. Meanwhile, a branch line L21b is connected to an input side of the inverting circuit 100 from the branch point P12 at the downstream side of the engine shut-off switch SW2, so that the ON/OFF signal S1a of the engine shut-off switch SW2 is input to the inverting circuit 100. Output of the inverting circuit 100 is connected to a switch 101 which is actualized with a transistor and a lamp 102 is connected to an output end of the switch 101.

Accordingly, the inverting circuit 100 does not operate when the key switch SW1 is in the OFF state and the inverting circuit 100 operates only when the key switch SW1 is in the ON state. In a state that the inverting circuit 100 is in operation, the ON/OFF signal S1a of the engine shut-off switch SW2 is input to the inverting circuit 100 and a signal is output as being inverted. That is, when the engine shut-off switch SW2 is in the ON (connected) state, output is provided to the switch 101 as being inverted into the OFF state by the inverting circuit 100. Accordingly, the switch 101 is maintained in the OFF state and the lamp 102 is not lighted. On the other hand, when the engine shut-off switch SW2 is in the OFF (disconnected) state, output is provided to the switch 101 as being inverted into the ON state by the inverting circuit 100. Accordingly, the switch 101 is switched into the ON state and the lamp 102 is lighted.

With the above, since the lamp 102 is lighted only when the engine shut-off switch SW2 is in the OFF (disconnected) state while the key switch SW1 is in the ON state, an operator can easily recognize that the engine shut-off switch SW2 is in the disconnected state. It is preferable that the lamp 102 is arranged at a position where the operator can easily take a look from the driver's seat, for example, possibly at the monitor TA, at the vicinity of the monitor TA, or the like. Here, not limited to lighting with the lamp 102, other notification means may be adopted as long as being capable of notifying that the engine shut-off switch SW2 is in operation.

Here, as illustrated in FIG. 6, it is also possible that a branch line L100 which inputs the output of the inverting circuit 100 to the control unit C1 from a point between the inverting circuit 100 and the switch 101 is arranged and that the control unit C1 further performs the invalidation process of the process for abnormality detection described in step S104 based on an ON signal S100 input from the branch line L100. When the engine shut-off switch SW2 is in the OFF state, the inverting circuit 100 outputs the ON signal S100 inverted into the ON state to the control unit C1 via the branch line L100. In a case that the ON signal S100 is in the ON state, the control unit C1 determines that the engine shut-off switch SW2 is in the OFF state and performs the invalidation process of the process for abnormality detection. As described in the first embodiment, the invalidation process of the process for abnormality detection causes not to perform an unnecessary process for abnormality detection such as a counting process of the number of abnormality occurrence times and a display process and a buzzer rumbling process which correspond to abnormality detection. Consequently, the number of abnormality occurrence times can be accurately obtained and unnecessary displaying and rumbling can be suppressed.

According to the second embodiment, it is possible to rapidly notify an operator that the engine shut-off switch is in operation with a simple circuit configuration without adding a modification to the monitor controller CA and one or more other controllers.

Third Embodiment

Figure 7:
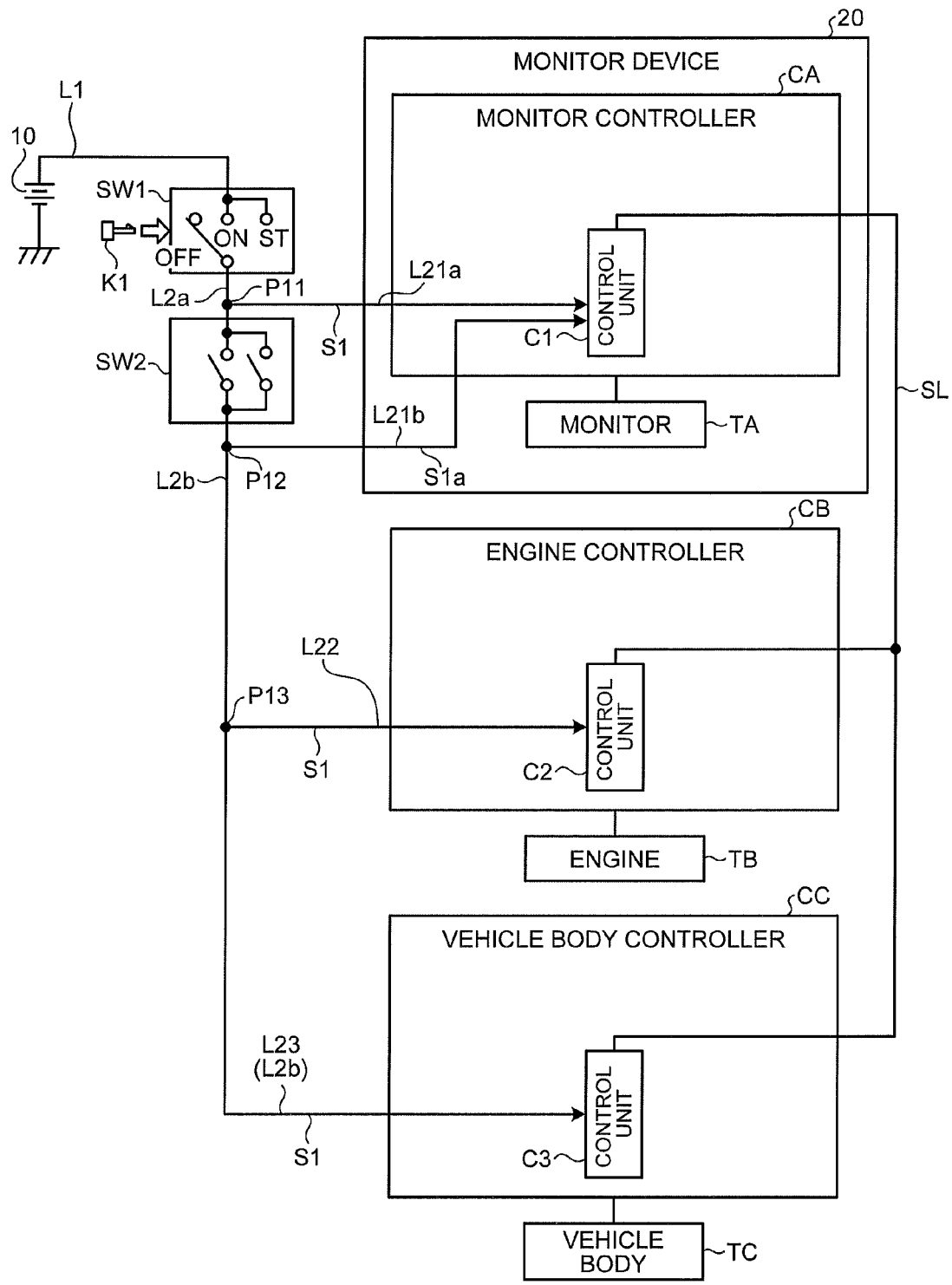
FIG. 7 is a block diagram illustrating a general circuit configuration of a vehicle status notification device for a construction machine according to a third embodiment of the present invention.

In the first and second embodiments described above, each controller includes the holding circuit 11, 21, 31. However, in a third embodiment, each controller does not include the holding circuit 11, 21, 31 as illustrated in FIG. 7. In this case, since the ON/OFF signal S1a at the downstream side of the engine shut-off switch SW2 can be obtained in a state that power is supplied from the battery 10 as the key switch SW1 being in the ON state, the monitor device 20 can recognize the ON/OFF state of the engine shut-off switch SW2. As a result, the monitor device 20 can perform the monitor control process as illustrated in FIG. 2.

In the abovementioned embodiments, it is preferable that the holding circuits 21, 31 are provided to controllers other than the monitor controller CA, that is, the engine controller CB and the vehicle body controller CC. However, it is also possible not to be provided.

Further, in the abovementioned embodiments, description is performed with a hydraulic shovel as an example of a construction machine. However, not limited to this, it may be adopted to a wheel loader and the like. That is, the abovementioned embodiments can be adapted generally to a construction machine having an engine shut-off switch.

REFERENCE SIGNS LIST

10 BATTERY
11, 21, 31 HOLDING CIRCUIT
12, 22, 32 INTERNAL POWER CIRCUIT
13, 23, 33 ROM
14, 24, 34 RAM
15, 25, 35 EEPROM
20 MONITOR DEVICE
100 INVERTING CIRCUIT
101 SWITCH
102 LAMP
CA MONITOR CONTROLLER
CB ENGINE CONTROLLER
CC VEHICLE BODY CONTROLLER
C1 to C3 CONTROL UNIT
SW1 KEY SWITCH
SW2 ENGINE SHUT-OFF SWITCH
SW11, SW12, SW13 INTERNAL POWER SWITCH
TA MONITOR
TB ENGINE
TC VEHICLE BODY
OR1 to OR3 OR CIRCUIT
K1 KEY
L1 POWER LINE
L11, L2, L2a, L2b, L21a, L21b, L21c, L22, L23 (L2b), L100 BRANCH LINE
P1, P2, P11, P12, P13 BRANCH POINT
S1, S1a, S21, S22, S23, S100 ON/OFF SIGNAL
S11, S12, S13 OPERATING SIGNAL
SL SIGNAL LINE

The invention claimed is:

1. A vehicle status notification device for a construction machine, comprising:
a key switch connected to a battery;
an engine shut-off switch which is serially connected to a downstream side of the key switch in a connection line between the battery and an engine controller configured to control engine operation; and
a control unit configured to perform control to notify a notification unit that the engine shut-off switch is in an OFF state in a case that a signal at the downstream side of the engine shut-off switch is in the OFF state while a signal at an upstream side of the engine shut-off switch is in an ON state.

2. The vehicle status notification device for a construction machine according to claim 1,
wherein the control unit is arranged in a monitor controller.

3. The vehicle status notification device for a construction machine according to claim 1,
wherein the control unit is composed of a discrete component.

4. The vehicle status notification device for a construction machine according to claim 3,
wherein the control unit is an inverting circuit configured to use the single at the upstream side of the engine shut-off switch as a power source when the signal at the upstream side of the engine shut-off switch is in the ON state and to use the signal at the downstream side of the engine shut-off switch as an input signal.

5. The vehicle status notification device for a construction machine according to claim 1,
wherein the control unit is configured to perform, in a case that the signal at the downstream side of the engine shut-off switch is in the OFF state, processing control to invalidate a process for abnormality detection which is to be performed when the signal at the downstream side of the engine shut-off switch is in the ON state.

6. The vehicle status notification device for a construction machine according to claim 1,
wherein the engine shut-off switch is configured to be surrounded by a switch state protecting unit configured to protect an ON/OFF state of the engine shut-off switch.

7. The vehicle status notification device for a construction machine according to claim 6,
wherein the switch state protecting unit is a cover configured to cover the engine shut-off switch.

8. The vehicle status notification device for a construction machine according to claim 1,
wherein the engine shut-off switch is arranged at a lower part of a driver's seat.

9. The vehicle status notification device for a construction machine according to claim 1, further comprising a monitor configured to display and output at least a control content of the control unit,
wherein the notification unit is the monitor and causes a display screen of the monitor to display and output that the engine shut-off switch is in the OFF state.

10. The vehicle status notification device for a construction machine according to claim 2,
wherein the monitor controller includes a holding circuit configured to cause power to be supplied directly from the battery into the monitor controller in a case that the signal at the upstream side of the engine shut-off switch is in the ON state and to cause power to be supplied directly from the battery into the monitor controller during the monitor controller is in operation even when the signal at the upstream side of the engine shut-off switch is switched into the OFF state.

11. A vehicle status notification device for a construction machine, comprising:
- a monitor controller configured to perform monitoring of operational status of the construction machine;
- one or more other controllers configured to output various data to the monitor controller, the controllers including an engine controller configured to control engine operation;
- a key switch connected to a battery;
- an engine shut-off switch which is serially connected to a downstream side of the key switch in a connection line between the battery and the engine controller; and
- a control unit configured to perform control to switch a display screen of a monitor to output that the engine shut-off switch is in an OFF state to the display screen in a case that a signal at the downstream side of the engine shut-off switch is in the OFF state while a signal at an upstream side of the engine shut-off switch is in an ON state, and to perform, in a case that the signal at the downstream side of the engine shut-off switch is in the OFF state, processing control to invalidate a process for abnormality detection which is to be performed when the signal at the downstream side of the engine shut-off switch is in the ON state.

12. A vehicle status notification method for a construction machine including a key switch connected to a battery and an engine shut-off switch which is serially connected to a downstream side of the key switch in a connection line between the battery and an engine controller to control engine operation, the method comprising:
- performing control to notify a notification unit that the engine shut-off switch is in an OFF state in a case that a signal at the downstream side of the engine shut-off switch is in the OFF state while a signal at an upstream side of the engine shut-off switch is in an ON state.

13. The vehicle status notification method for a construction machine according to claim 12, further comprising
- performing, in a case that the signal at the downstream side of the engine shut-off switch is in the OFF state, processing control to invalidate a process for abnormality detection which is to be performed when the signal at the downstream side of the engine shut-off switch is in the ON state.

* * * * *